United States Patent
Boltjes

(10) Patent No.: US 8,607,814 B1
(45) Date of Patent: Dec. 17, 2013

(54) ACTIVE PIPE CUTOFF VALVE INSTALLATION ASSEMBLY

(76) Inventor: Justin Boltjes, Ethan, SD (US)

( * ) Notice: Subject to any disclaimer, the term of this patent is extended or adjusted under 35 U.S.C. 154(b) by 0 days.

(21) Appl. No.: 13/492,162

(22) Filed: Jun. 8, 2012

(51) Int. Cl.
*F16L 55/105* (2006.01)
*B23D 21/06* (2006.01)
*B26B 27/00* (2006.01)

(52) U.S. Cl.
USPC .................. 137/318; 30/92; 83/745; 285/197

(58) Field of Classification Search
USPC .................. 137/317, 318; 30/92, 95, 96, 116; 83/745; 285/197
See application file for complete search history.

(56) References Cited

U.S. PATENT DOCUMENTS

| | | | |
|---|---|---|---|
| 2,120,114 A * | 6/1938 | Patton | 83/169 |
| 3,687,166 A * | 8/1972 | Herrin | 138/94 |
| 3,699,996 A | 10/1972 | Nichols | |
| 3,867,964 A | 2/1975 | Gardner | |
| 4,067,353 A * | 1/1978 | DeHoff | 137/318 |
| 4,091,533 A * | 5/1978 | Saumell | 30/95 |
| 4,464,836 A * | 8/1984 | Hissa | 30/92 |
| 4,527,586 A | 7/1985 | Yano et al. | |
| 4,552,170 A | 11/1985 | Margrave | |
| 4,628,955 A | 12/1986 | Smith | |
| 5,269,340 A * | 12/1993 | Drzewiecki | 137/318 |
| 5,316,037 A | 5/1994 | Martin | |
| 5,327,923 A | 7/1994 | Eischen et al. | |
| 5,483,990 A | 1/1996 | Martin | |
| 5,611,365 A | 3/1997 | Maichel | |
| 5,732,728 A | 3/1998 | Maichel | |
| 5,873,295 A * | 2/1999 | Hall | 83/820 |
| 6,470,907 B1 | 10/2002 | Sato et al. | |
| 6,530,389 B2 | 3/2003 | Sato et al. | |
| 6,698,444 B1 * | 3/2004 | Enston | 137/15.06 |
| 7,225,827 B2 * | 6/2007 | Maichel et al. | 137/318 |

* cited by examiner

*Primary Examiner* — Kevin Lee

(57) ABSTRACT

An active pipe cutoff valve installation assembly includes a conduit having an top section mating with a bottom section forming the conduit having first and second open ends. Medial seals are positioned in the conduit abutting a pipe extending through the conduit and defining a sealed chamber corresponding to a medial section of the conduit. A valve is coupled to the conduit having an gate extendable into the medial section the conduit whereby flow through the conduit is cut off. A wire extends into and through the medial section of the conduit. The wire cuts the pipe while the pipe is positioned in the sealed chamber. The wire is aligned with the gate of the valve so the gate cuts off flow through the pipe.

12 Claims, 5 Drawing Sheets

US 8,607,814 B1

ACTIVE PIPE CUTOFF VALVE INSTALLATION ASSEMBLY

BACKGROUND OF THE DISCLOSURE

1. Field of the Disclosure

The disclosure relates to pipe cutoff valve devices and more particularly pertains to a new pipe cutoff valve device for installing a cutoff valve to a pipe without having to shut off flow through the pipe prior to installation.

2. Summary of the Disclosure

An embodiment of the disclosure meets the needs presented above by generally comprising a conduit having an top section and a bottom section. The top section mates with the bottom section to form the conduit having a first open end and a second open end. A pair of medial seals is coupled to and positioned in the conduit. The medial seals abut a pipe extending through the conduit defining a sealed chamber corresponding to a medial section of the conduit between the first and second ends of the conduit. A valve is coupled to the conduit having an gate extendable into the medial section the conduit whereby flow through the conduit is cut off. A wire extends into and through the medial section of the conduit. The wire cuts the pipe while the pipe is positioned in the sealed chamber. The wire is aligned with the gate of the valve so the gate cuts off flow through the pipe.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
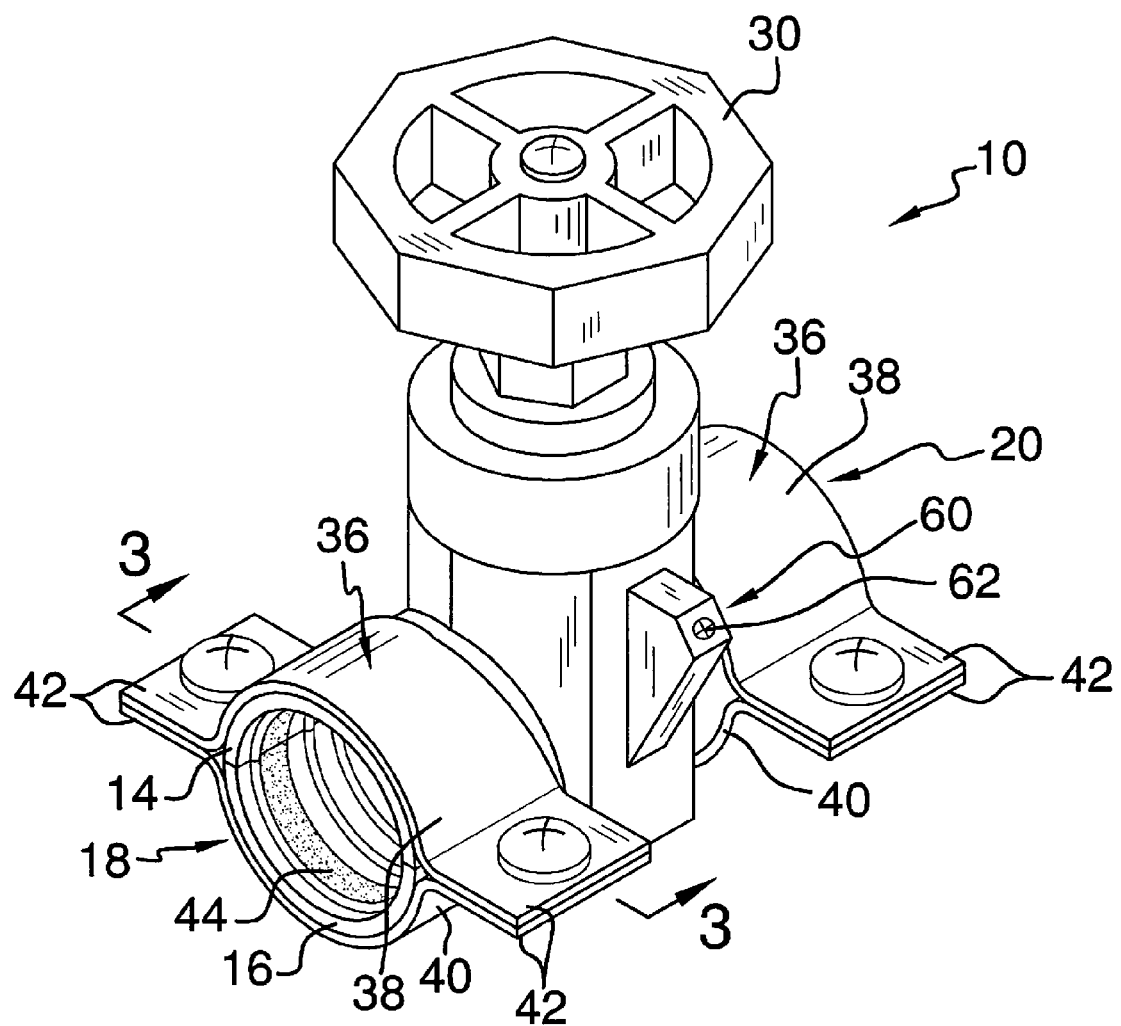
FIG. 1 is a top front side perspective view of a active pipe cutoff valve installation assembly according to an embodiment of the disclosure.
Figure 2:
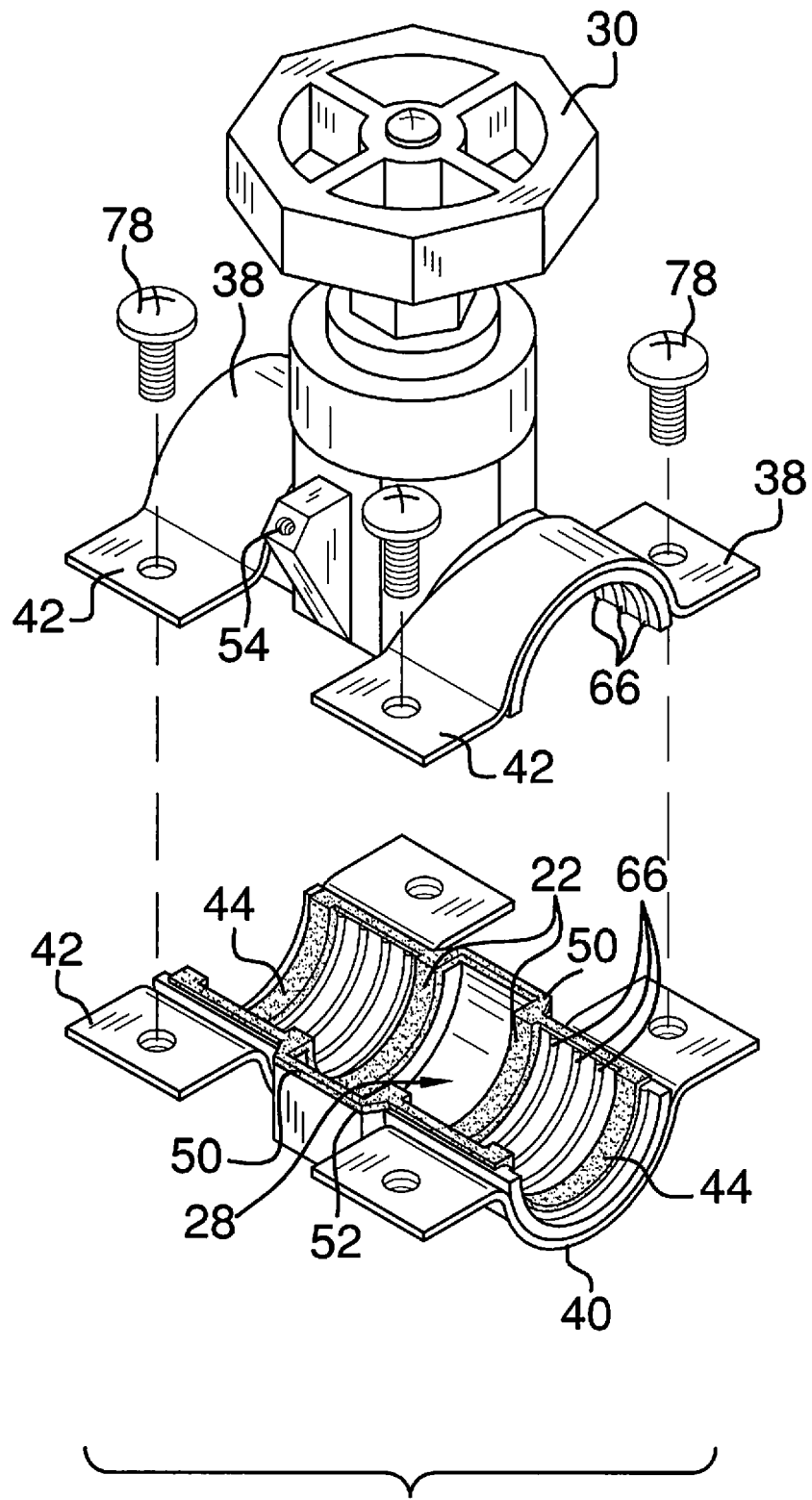
FIG. 2 is a partially exploded top front side perspective view of an embodiment of the disclosure.
Figure 4:
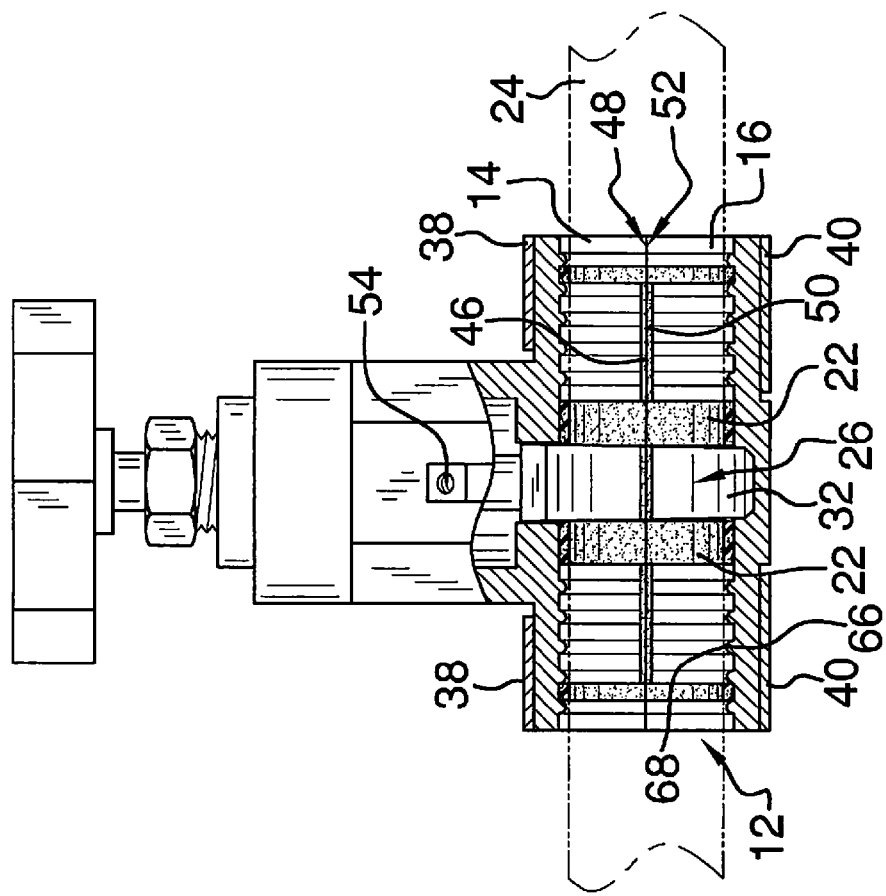
FIG. 4 is a partial cut-away side view of an embodiment of the disclosure in a closed position.
Figure 3:
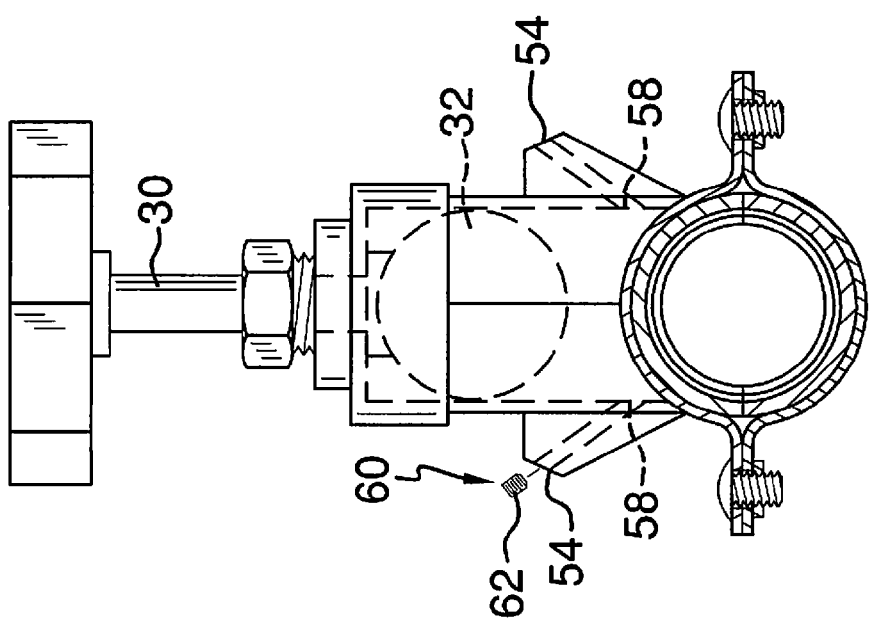
FIG. 3 is a cross-sectional view of an embodiment of the disclosure taken along line 3-3 of FIG. 1.
Figure 5:
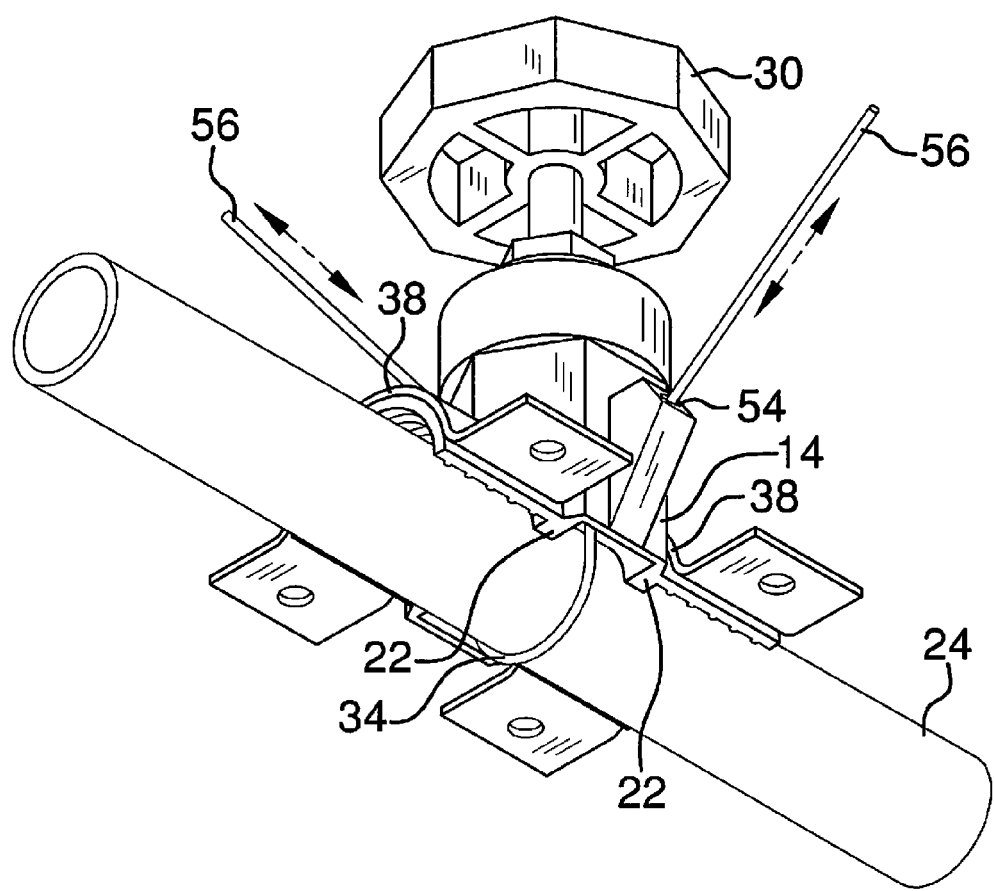
FIG. 5 is a bottom front side perspective view of an embodiment of the disclosure.
Figure 6:
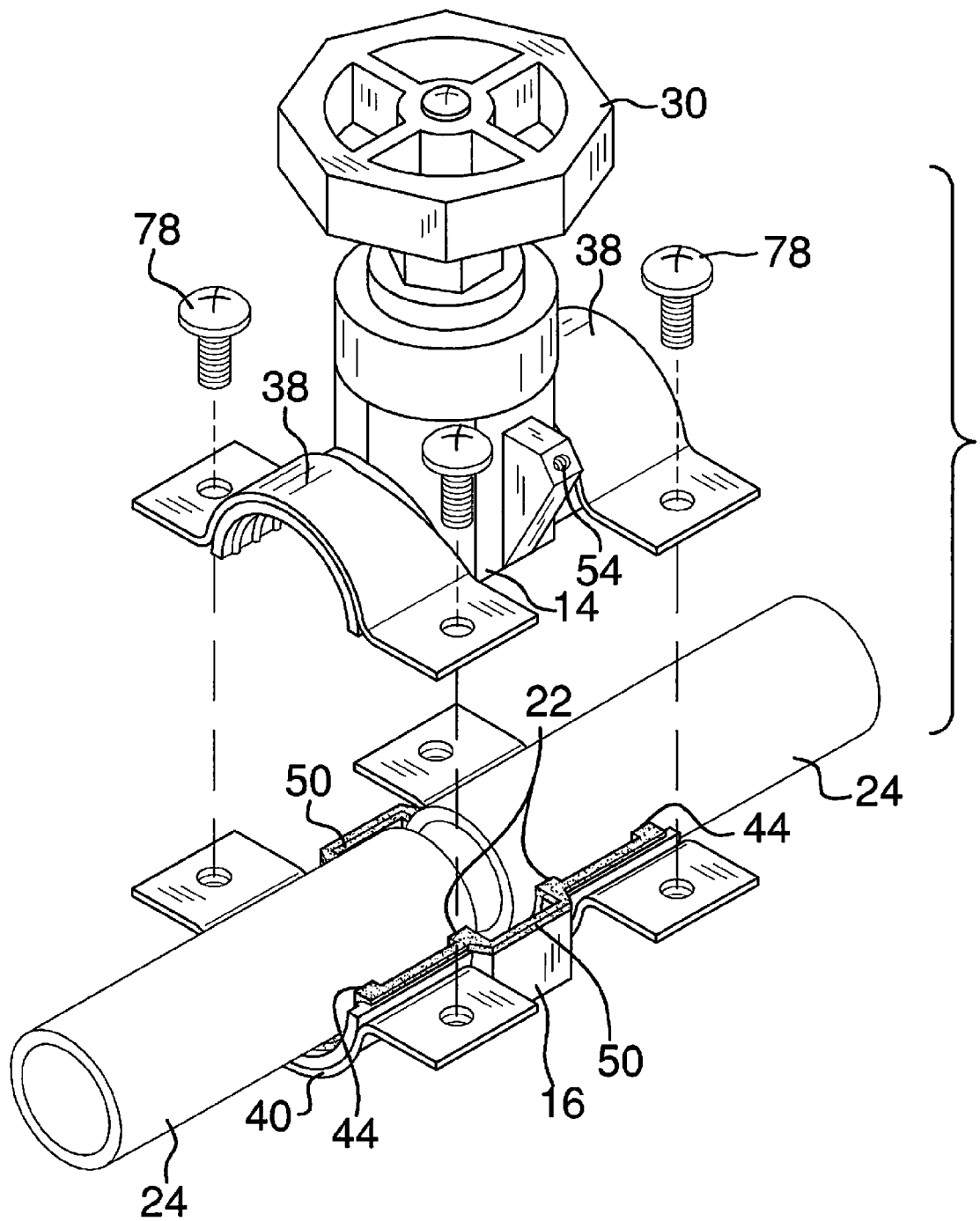
FIG. 6 is a partially exploded top front side perspective view of an embodiment of the disclosure.

With reference now to the drawings, and in particular to FIGS. 1 through 6 thereof, a new pipe cutoff valve device embodying the principles and concepts of an embodiment of the disclosure and generally designated by the reference numeral 10 will be described.

As best illustrated in FIGS. 1 through 6, the active pipe cutoff valve installation assembly 10 generally comprises a conduit 12 having an top section 14 and a bottom section 16. The top section 14 mates with the bottom section 16 to form the conduit 12 having a first open end 18 and a second open end 20. A pair of medial seals 22 is coupled to and positioned in the conduit 12 extending fully around both the top section 14 and the bottom section 16. The medial seals 22 are configured to abut a pipe 24 extending through the conduit 12 defining a sealed chamber 26. The sealed chamber 26 corresponds to a medial section 28 of the conduit 12 positioned between the first end 18 and second end 20 of the conduit 12. A valve 30 is coupled to the conduit 12 and may be coupled particularly to the top section 14. The valve 30 has a gate 32 selectively extendable into the medial section 28 of the conduit 12 whereby flow through the conduit 12 is cut off. A wire 34 extends into and through the medial section 28 of the conduit 12 where it is positioned around the pipe 24. The wire 34 is configured for cutting through the pipe 24 while the pipe 24 is positioned in the sealed chamber 26. The wire 34 is aligned with the gate 32 of the valve 30.

A pair of clamps 36 is coupled to the top section 14 and bottom section 16 of the conduit 12 to secure the conduit 12 to the pipe 24. Each clamp 36 is positioned adjacent to an associated one of the first end 18 and second end 20 of the conduit 12. Each clamp may further have an upper portion 38 and a lower portion 40. The upper portion 38 is coupled to the lower portion 40 by aligned flanges 42 extending from the conduit 12 when the clamp 36 is coupled to the conduit 12. Fasteners 78 are inserted through the flanges 42 and secured to hold the clamps 36 in place.

A pair of outer seals 44 may be coupled to the conduit 12 extending fully around the conduit 12 across both the top section 14 and the bottom section 16. The outer seals 44 are configured to abut the pipe 24 when the conduit 12 is coupled to the pipe 24. Each of the outer seals 44 is positioned proximate to an associated one of the first end 18 and the second end 20 of the conduit 12. Each of the clamps 36 may be aligned with an associated one of the outer seals 44 to further secure the conduit 12 to the pipe 24 to prevent leaking from the conduit 12 when it is engaged to the pipe 24 and the pipe 24 is cut by the wire 34. An upper lateral seal 46 may be coupled to and extend along each bottom edge 48 of the top section 14 of the conduit 12. The upper lateral seal 46 may extend continuously between the outer seals 44. A corresponding lower lateral seal 50 may be coupled to and extend along each top edge 52 of the bottom section 16 of the conduit 12 and extend continuously between the outer seals 44. The lower lateral seal 50 engages the upper lateral seal 46 when the top section 14 is coupled to the bottom section 16 forming the conduit 12 and further prevents leaks from the conduit 12 when the pipe 24 is cut.

A pair of wire access holes 54 extend into and through the top section 14 of the conduit 12. The wire 34 is inserted through the wire access holes 54 such that end sections 56 of the wire 34 extend out of the wire access holes 54 whereby the wire 34 is configured to be grasped and manipulated to cut through the pipe 24 extending through the conduit 12. Each of the wire access holes 54 may be angled such that lower ends 58 of the access holes 54 are positioned at a distance from each other less than an inner diameter of the conduit 12. The lower ends 58 may also be positioned adjacent to a top of the inner diameter of the conduit 12 whereby the wire 34 will cut fully through the pipe 24. A pair of plugs 60 may be coupled to the wire access holes 54 when the wire 34 is removed from the wire access holes 54 to prevent leakage from the sealed chamber 26. The wire access holes 54 may be threaded the plugs may be set screws 62.

A plurality of ribs 66 may extend circumferentially around the conduit 12. The ribs 66 are positioned in spaced relationship extending between the medial seals 22 and the outer seals 44. Each rib 66 has a distal edge 68 relative to the conduit 12. The distal edge 68 of each rib 66 is configured to abut the pipe 24 when the conduit 12 is coupled to the pipe 24 to further inhibit leakage.

In use, the wire 34 is inserted through one of the access holes 54, extended around the pipe 24, and back through the other access hole 54. The top section 14 is positioned on the pipe and then the bottom section 16 is positioned on the pipe 24 abutting the top section 14 with the wire 34 positioned in the medial section 28. The clamps 36 are coupled to the conduit 12 to hold it in place on the pipe 24. The wire 34 is manipulated to cut the pipe 24. The wire 34 is removed and set screws 62 are positioned in the access holes 54. The valve 30 may then be manipulated to extend the gate 32 to cut off flow through the pipe 24. The assembly 10 may be installed and used as a temporary cutoff for flow in a pipe, then the valve 30 reopened and the assembly 10 left in place indefinitely if so desired.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A pipe cutoff valve installation assembly comprising:
a conduit having an top section and a bottom section, said top section mating with said bottom section to form said conduit having a first open end and a second open end;
a pair of medial seals coupled to and positioned in said conduit, said seals being configured to abut a pipe extending through said conduit defining a sealed chamber, said sealed chamber corresponding to a medial section of said conduit positioned between said first and second ends of said conduit;
a valve coupled to said conduit, said valve having a gate selectively extendable into said medial section of said conduit whereby flow through said conduit is cut off; and
a wire extending into and through said medial section of said conduit, said wire being configured for cutting through the pipe while the pipe is positioned in the sealed chamber, said wire being aligned with said gate of said valve.

2. The assembly of claim 1, further including a pair of clamps, each clamp being coupled to said top and bottom sections of said conduit, each clamp being positioned adjacent to an associated one of said first and second ends of said conduit.

3. The assembly of claim 2, further including each clamp having an upper portion and a lower portion, said upper portion being coupled to said lower portion by aligned flanges extending from said conduit when said clamp is coupled to said conduit.

4. The assembly of claim 1, further including a pair of outer seals coupled to said conduit, said outer seals being configured to abut the pipe when the conduit is coupled to the pipe, each of said outer seals being positioned proximate to an associated one of said first end and said second end of said conduit.

5. The assembly of claim 4, further including a pair of clamps, each clamp being coupled to said top and bottom sections of said conduit, each clamp being positioned adjacent to an associated one of said first and second ends of said conduit, each of said clamps being aligned with an associated one of said outer seals.

6. The assembly of claim 1, further comprising:
an upper lateral seal coupled to and extending along a bottom edge of said top section of said conduit; and
a lower lateral seal coupled to and extending along a top edge of said bottom section of said conduit, said lower lateral seal engaging said upper lateral seal when said top section is coupled to said bottom section forming said conduit.

7. The assembly of claim 1, further including a pair of wire access holes extending through said conduit, said wire being inserted through said wire access holes such that end sections of said wire extend out of said wire access holes whereby said wire is configured to be grasped and manipulated to cut through the pipe extending through said conduit.

8. The assembly of claim 7, further including a pair of plugs couplable to said wire access holes when said wire is removed from said wire access holes.

9. The assembly of claim 7, further including said wire access holes being threaded and said plugs being set screws.

10. The assembly of claim 4, further including a plurality of ribs extending circumferentially around said conduit, said ribs being positioned in spaced relationship extending between said medial seals and said outer seals.

11. The assembly of claim 10, further including each rib having a distal edge relative to said conduit, said distal edge of each said rib being configured to abut the pipe when the conduit is coupled to the pipe.

12. A pipe cutoff valve installation assembly comprising:
a conduit having an top section and a bottom section, said top section mating with said bottom section to form said conduit having a first open end and a second open end;
a pair of medial seals coupled to and positioned in said conduit, said seals being configured to abut a pipe extending through said conduit defining a sealed chamber, said sealed chamber corresponding to a medial section of said conduit positioned between said first and second ends of said conduit;
a valve coupled to said conduit, said valve having a gate selectively extendable into said medial section of said conduit whereby flow through said conduit is cut off;
a wire extending into and through said medial section of said conduit, said wire being configured for cutting through the pipe while the pipe is positioned in the sealed chamber, said wire being aligned with said gate of said valve;
a pair of clamps, each clamp being coupled to said top and bottom sections of said conduit, each clamp being positioned adjacent to an associated one of said first and second ends of said conduit, each clamp having an upper portion and a lower portion, said upper portion being coupled to said lower portion by aligned flanges extending from said conduit when said clamp is coupled to said conduit;

a pair of outer seals coupled to said conduit, said outer seals being configured to abut the pipe when the conduit is coupled to the pipe, each of said outer seals being positioned proximate to an associated one of said first end and said second end of said conduit, each of said clamps being aligned with an associated one of said outer seals;

an upper lateral seal coupled to and extending along a bottom edge of said top section of said conduit;

a lower lateral seal coupled to and extending along a top edge of said bottom section of said conduit, said lower lateral seal engaging said upper lateral seal when said top section is coupled to said bottom section forming said conduit;

a pair of wire access holes extending through said conduit, said wire being inserted through said wire access holes such that end sections of said wire extend out of said wire access holes whereby said wire is configured to be grasped and manipulated to cut through the pipe extending through said conduit, said wire access holes being threaded;

a pair of plugs couplable to said wire access holes when said wire is removed from said wire access holes, and said plugs being set screws; and a plurality of ribs extending circumferentially around said conduit, said ribs being positioned in spaced relationship extending between said medial seals and said outer seals, each rib having a distal edge relative to said conduit, said distal edge of each said rib being configured to abut the pipe when the conduit is coupled to the pipe.

* * * * *